J. K. McCLURE.
Seeder and Cultivator.

No. 105,229. Patented July 12, 1870.

United States Patent Office.

JONES K. McCLURE, OF CORNERSVILLE, MISSISSIPPI.

Letters Patent No. 105,229, dated July 12, 1870.

IMPROVEMENT IN COMBINED SEEDER, PLANTER, CULTIVATOR, AND HARROW.

The Schedule referred to in these Letters Patent and making part of the same.

To all whom it may concern:

Be it known that I, JONES K. MCCLURE, of Cornersville, in the county of Marshall and State of Mississippi, have invented a new and useful Improvement in Combined Seed-Planter, Cultivator, and Harrow; and I do hereby declare that the following is a full, clear, and exact description thereof, which will enable others skilled in the art to make and use the same, reference being had to accompanying drawing forming part of this specification, in which—

Figure 1:
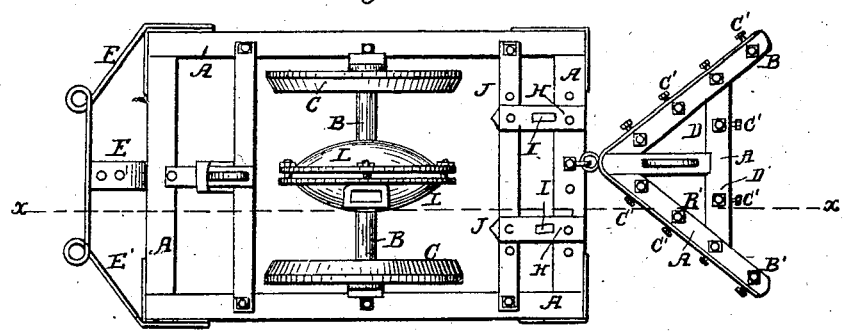
Figure 1 is a top view of my improved machine, showing a dray cultivating-harrow attached to the frame.
Figure 2:
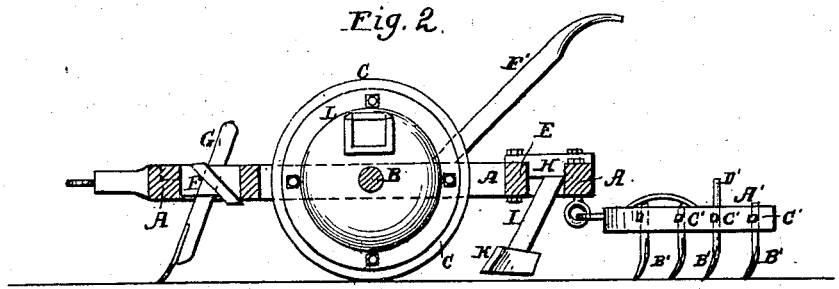
Figure 2 is a longitudinal section of the same, taken through the line $x\ x$ of fig. 1.
Figure 3:
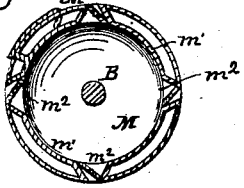
Figure 3 is a detail sectional view of the corn-dropping device.

My invention has for its object to furnish an improved seed-planting machine, which may be easily adjusted for use as a cotton-seed planter, or corn-planter, or cultivator, doing its work well in either capacity.

A is the frame of the machine, which is made rectangular in form, and of convenient size. For ordinary use, three and a half feet long, and two and a half feet wide, would be a suitable size.

B is the axle or cross-shaft of the machine, the ends or journals of which revolve in bearings detachably attached to the middle parts of the side bars of the frame A.

C are the wheels, the rims of which are made broad, and are beveled upon their inner edges for about two-thirds their breadth, and which are securely keyed or otherwise detachably attached to the shaft B, so as to carry the said shaft with them in their revolution.

D E are two cross-bars, the ends of which are notched into the front and rear parts of the side bars of the frame A, and which are detachably secured to said frame by bolts, as shown in the drawing.

F is a short bar or beam, the ends of which are detachably bolted to the middle parts of the front bar of the frame A and front bar D.

G is the standard of the furrowing-plow, by which the furrow is opened to receive the seed, said standard G being adjustably secured to the bar or beam F by a link or other suitable means.

H are short arms or beams, the ends of which are bolted to the rear bar of the frame A, and to the rear cross-bar E.

To the bars or beams H are securely attached the upper ends of the standards I, to the lower ends of which are attached the covering-plows J, cotton-scrapers K, cultivator-plows, or turn-plows, as may be desired, in each case each plow having its own standard, I, and its own bar, H.

In planting cotton-seed, the furrowing and covering-plows are arranged in place as hereinbefore described, and the cotton-seed dropper L is placed upon and secured to the center of the shaft or axle B, so as to be carried around by and with said axle in its revolution.

The seed-dropper L is formed of two concave disks, the edges of which are flattened and turned inward.

To the flattened part of the edges of one of these disks is attached a number of bolts, which pass through holes in the flattened part of the edge of the other disk, each of said bolts being provided with two nuts, placed one upon each side of the adjustable disk, so that, by adjusting the position of the said nuts, the two disks may be adjusted further apart or closer together, according to the quantity of seed required to be dropped.

The dropper L is made with a door in one of the disks, for the introduction of the cotton-seed.

In planting corn, the dropper L is detached and replaced with the dropper M, which consists of two concave disks, the edges of which are flattened, and which are connected to each other by a band, soldered, or otherwise securely attached to them. The band of the dropper M has openings formed in it, at suitable distances apart, for the escape of the seed.

$m^1$ are segmental partitions or bands extending along the inner edges of the flattened edges of the disks M, ends of which are bent down to meet the edges of the openings in the band of the dropper, thus forming hopper-shaped spaces at the inner side of the said discharge-openings, in which spaces are pivoted valves $m^2$.

The seed is introduced into the dropper M through a door in its edge-band, or in the side of one of its disks.

By this construction, as the dropper is revolved the weight of the corn holds the valves $m^2$ closed until the discharge-openings have passed the lowest point, when the direction of the pressure of the seed being changed the position of the valves is reversed, allowing the seed in the angular space upon the inner side of the valve, which is sufficient for a hill to drop to the ground, the dropper thus working automatically.

By securing any desired proportion of the valves $m^2$, so that they cannot operate, the distance apart of the hills may be regulated at will.

R is an ordinary harrow, the teeth of which have screw-threads cut upon their upper ends, and are secured in place by nuts.

The harrow R is connected with the frame A by eye-bolts or other flexible connection, so that its movements may be free, and may be connected with the front or rear cross-bar of said frame A, as may be desired.

A' is the frame of the cultivating-harrow, the shanks of the cultivator-teeth B' of which are adjustably secured to the frame A' by set-screws C', so that they may be adjusted to work deeper or shallower in the ground, as may be required.

The teeth B' are so arranged that the harrow may be drawn over the row of plants, cultivating both sides of said row at the same time.

D' are two turn teeth, which are adjustably secured to the cross-bar of the frame A, by set-screws C', in the same manner as the other teeth B'.

By changing the teeth D' from one side to the other, they may be adjusted to turn the soil toward or from the plants, as may be desired.

The cultivating harrow may be used alone or with the cotton-scrapers H I K.

E' is the draft-bar or bars of the machine, which is made with points of attachment for the draft, and thus a clevis being attached to the beam E, so that one, two, or three horses may be used, as may be desired or necessary.

F' are the handles, which are secured to the side bars of the frame A, by bolts or staples, and which may be supported and strengthened by uprights or standards in the ordinary manner.

Having thus described my invention,

I claim as new and desire to secure by Letters Patent—

The combination of the cotton-seed dropper L, axle or shaft, B, wheels O, frame, A, cross-bars D and E, furrowing-plows F G, and covering-plows H I J, with each other, substantially as herein shown and described and for the purpose set forth.

JONES K. McCLURE.

Witnesses:
A. C. BATEMAN,
A. E. MOORE.